March 3, 1964  W. H. GREENBERG  3,123,176
SONAR DOME

Filed Sept. 15, 1959  2 Sheets-Sheet 1

Frequency in KC Per Second

INVENTOR.
WALTER H. GREENBERG
BY
ATTORNEY

March 3, 1964  W. H. GREENBERG  3,123,176
SONAR DOME
Filed Sept. 15, 1959  2 Sheets-Sheet 2

INVENTOR.
WALTER H. GREENBERG
BY Arthur H. Seidel
ATTORNEY

United States Patent Office 3,123,176
Patented Mar. 3, 1964

3,123,176
SONAR DOME
Walter H. Greenberg, Syosset, N.Y., assignor to Riverside Plastics Corporation, Hicksville, N.Y., a corporation of New York
Filed Sept. 15, 1959, Ser. No. 840,079
5 Claims. (Cl. 181—.5)

The present invention is directed to a sonar dome, and more particularly to a sonar dome having excellent acoustic impedance matching characteristics to water.

The requirements for sonar domes and windows have changed with the advant of higher speed vessels and more efficient sonar equipment. The higher under water speeds have caused a self-noise problem which tends to limit sonar performance. Thus, locally generated noise may drastically affect sonar performance, since detection of the signal over the background noise may be rendered exceedingly difficult.

This invention has as an object the provision of a sonar dome, and by sonar dome as used herein is meant sonar domes and/or windows in their broadest sense in all sizes and of all types, which will effect rapid decay of localized and locally generated noises.

This invention has as another object the provision of a sonar dome whose signal transmission capabilities to self-noise ratio is drastically improved over contemporary sonar domes.

This invention has as a still further object the provision of a sonar dome having an excellent acoustic impedance match to water.

This invention has as a still further object the provision of a sonar dome having good structural strength characteristics.

Other objects will appear hereinafter.

For the purpose of illustrating the invention there is shown in the drawings a form which is presently preferred; it being understood, however, that this invention is not limited to the precise arrangements and instrumentalities shown.

Figure 1:
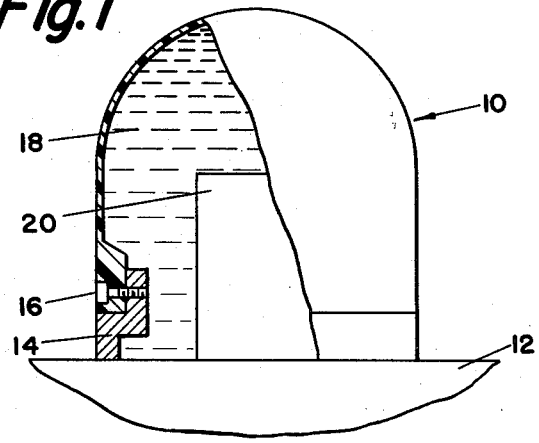
FIGURE 1 is a diagrammatic view of a sonar dome of the present invention.

Referring to the drawings, the sonar dome 10 of the present invention may have any desired shape or form. Thus, the present invention does not lie in a particular shape or form for the sonar dome, but in the sonar dome being formed from a particular material as will be more fully described below.

Thus, a sonar dome of the present invention, as shown in FIGURE 1, may be generally of suitable hydrodynamic shape and typically secured to the hull 12 of the vessel on which the sonar dome 10 is mounted by means of flanges 14 and bolts 16. As will be evident to one skilled in the art of the structure and mounting of sonar domes, the flanges 14 and bolts 16 should be flush with the outer surface of the dome 10 in order to avoid local self-noise generation, as by the formation of eddies or deformation of boundary layer flow of the dome 10. The flanges and bolts should be acoustically insulated for further reduction of hull-transmitted vibrations.

The interior of the dome 10 is flooded with water 18, and within the dome 10 there is provided the transducer array 20. A block diagram of a transducer array 20 is shown in FIGURE 1.

Figure 2:
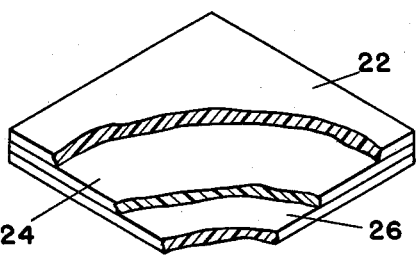
FIGURE 2 is a view, partly in section, of three laminated plastic layers representative of the laminated composition of the sonar dome of FIGURE 1.

The dome 10 of the present invention is formed, as seen in FIGURE 2, of three laminated reinforced plastic layers 22, 24 and 26.

The outer plastic layers or plies 22 and 26 are each relatively stiff, and preferably are acoustically identical in section. The center layer or ply, while being formed from reinforced plastic, differs acoustically in section from the outer plies 22 and 26, and is a relatively viscoelastic damping material when compared with the outer layers 22 and 26. The middle ply 24 is still stiff enough so that the entire structure of the dome 10 partakes of the same flexural motion. Stated differently, the thicknesses of the layers of the composite of the three layers should be small compared to the shortest wavelengths of any type of vibration within each layer. Specifically, the wavelength of shear waves in the center layer 24 must be large compared to the thickness of the center layer 24, as these waves have the shortest wavelengths.

The relative variation in the visco-elasticity of the center layer 24 in reference to the outer layers 22 and 26, namely the relative "softness" of the center layer 24 to the outer layers 22 and 26 in terms of acoustic transmission may be accomplished in a number of ways using the reinforced plastic laminates from which the sonar dome of the present invention is constructed.

For example, the relative stiffness and flexibility in terms of acoustic transmission may be varied by the use of different resins, as by using one type of resin in the outer plies 22 and 26, and another type of resin which forms a relatively visco-elastic damping material in the center layer 24. Alternatively, relative visco-elastic damping properties may be achieved by varying the types and/or amounts of reinforcement, as for example, the use of different discrete types of glass fabric, or glass fabric versus glass mat, or glass fabric versus nylon fabric, etc.

In any event, it is essential for the purposes of the present invention that the three layers 22, 24, and 26 each comprise a reinforced plastic because of the relatively excellent acoustic impedance matching between reinforced plastics and water. Thus, the plastic should be reinforced with a glass fiber, such as a glass fabric or a glass mat, or another suitable reinforcement material having similar reinforcement properties to glass in terms of strength and durability in the laminated plastic art, such as nylon.

Reinforced plastics of the aforesaid type possess excellent acoustic impedance matching characteristics to water enabling excellent acoustic matching to be achieved between the water within the dome and the water outside of the dome. Moreover, the reinforced plastic sonar domes of the present invention are relatively light in weight compared to metal sonar domes.

As illustrative of the laminated plastic materials of the present invention five three-ply panels were prepared having the following tabulated qualities. In the table the outer layers are designated "A" and "C," and the center layer is designated "B."

*Table No. 1*

| Panel | A | B | C |
|---|---|---|---|
| 1 | 90/10 | 70/30 | 90/10 |
| 2 | 90/10 | 50/50 | 90/10 |
| 3 | 90/10 | 90/10 | 90/10 |
| 4 | 90/10 | 60/40 | 90/10 |
| 5 | 90/10 | 80/20 | 90/10 |

The numbers shown above represent the ratio of relatively rigid polyester thermosetting resin formed from a dihydric alcohol and terephthalic acid to relatively flexible polyester thermosetting resin formed from a dihydric alcohol and terephthalic acid. The resins may be blended to produce intermediate degrees of flexibility. Thus, panel No. 3 is to be considered as the control panel since the flexibility of the center core is identical with the two faces, while panel No. 2 is to be considered the largest deviate from standard since it contains the largest amount of flexible resin, e.g. the visco-elastic damping characteristics of the center layer differed from the relatively rigid outer plies than any of the other panels.

The formation of panel No. 1 serves to illustrate the formation of a typical panel. This was effected as follows:

A mixture of 90 parts of relatively rigid polyester thermosetting resin and 10 parts of relatively flexible polyester thermosetting resin were catalyzed with 1% of methyl ethyl ketone peroxide. This material was thoroughly impregnated into fourteen plies of glass fabric. This was vacuum barrier molded at 160° F. using a polyvinyl alcohol barrier to produce a laminate. Upon cure of this laminate, the polyvinyl alcohol barrier was removed, and the upper ply of the fourteen ply laminate was similarly removed. A mixture consisting of 70 parts of relatively rigid polyester thermosetting resin and 30 parts of relatively flexible polyester thermosetting resin was catalyzed with 1% of methyl ethyl ketone peroxide. Fourteen plies of glass fabric was thoroughly saturated with this mix while on top of the 90/10 laminate described above. These fourteen plies were then vacuum barrier molded at 160° F. on top of the first thirteen ply laminate. The curing operation bonds the laminates. Upon cure, the vacuum barrier was removed as was the topmost ply of the fabric. This now leaves a twenty-six ply laminate consisting of two sections, thirteen plies each, one section of which is composed of a 90/10 mixture, and the other section of which is composed of a 70/30 mixture. A mixture was then prepared consisting of 90 parts of relatively rigid polyester thermosetting resin and 10 parts of relatively flexible polyester thermosetting resin and catalyzed with 1% of methyl ethyl ketone peroxide. Thirteen plies of glass fabric were thorougly saturated with this mixture while on top of the twenty-six ply laminate described above. This was then vacuum barrier molded at 160° F. The vacuum barrier was removed leaving a laminate of thirty-nine plies, the outer thirteen plies of which on both faces consisting of 90/10 mix, and the inner thirteen plies consisting of 70/30 mix. This is now considered to be a laminar laminate.

The formation of the remaining panels, namely panels Nos. 2 through 5 inclusive were identical to the one set forth above, except that the inner thirteen plies were characterized as in Table No. 1.

It is to be noted that while each of the layers illustrated in FIGURE 2 is shown as being formed from one ply, in actuality each of the layers or plies 22, 24, and 26 of FIGURE 2 is itself formed from a plurality of plies, namely in the case of the panels set forth above, thirteen plies to each layer.

The decay rate and critical damping rate for each of the panels referred to above was determined by the technique described in detail in the memorandum by J. E. Barger entitled "An Experimental Determination of the Degree of Damping of Structures," United States Navy Underwater Sound Laboratory Technical Memorandum No. 1210–94–59 of June 17, 1959.

Figure 3:
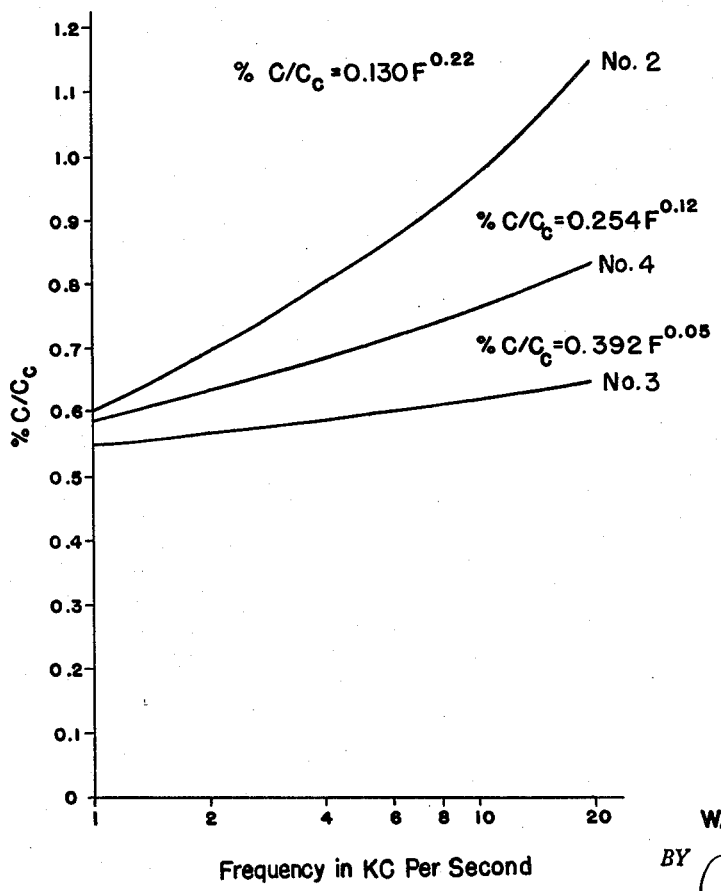
FIGURE 3 is graph revealing the relationship between frequency and decay rate in the sonar dome of the present invention.

The equation for panels 2, 3 and 4 relating the decay rate to the model frequency is shown in connection with each of these panels in the graph making up FIGURE 3.

Figure 4:
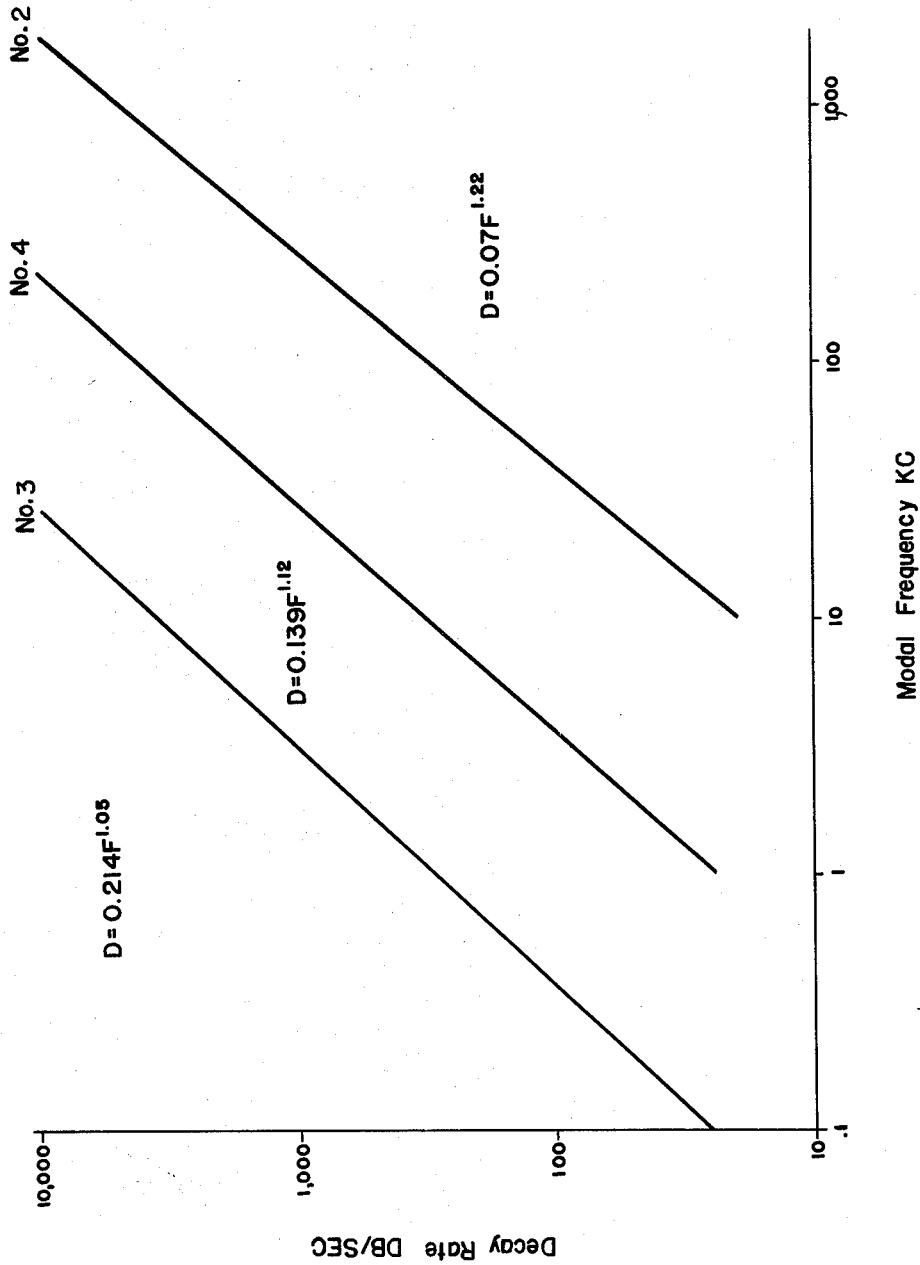
FIGURE 4 is a graph revealing the relationship between frequency and critical damping rate in the sonar dome of the present invention.

As seen from FIGURE 4, panel No. 2 which had the largest percentage of flexible polyester in the center ply had the highest percentage of critical damping. Panel No. 4 ranked second in damping.

The three panels Nos. 1, 3 and 5 were all quite similar, and therefore only the control panel No. 3 is shown in FIGURES 3 and 4.

It is recognized that high polymer materials, such as are used in this example, exhibit large loss tangents in shear. Since local vibration presents a shear moment as contrasted to the normal forces exerted by an underwater signal, the more visco-elastic polymer at the center of the laminate absorbs a portion of this undesirable shear force but does not affect the transmission of the signal. The explanation for this is apparently that the sonar window of the described construction exhibits a complex shear modulus but not a complex Young's modulus and it is therefore postulated that a hysteretic effect within the contained "less rigid" core provides the effective damping.

A rigorous comparison between the panels of the subject invention and steel in terms of dynamic acoustic transmission behavior revealed that the panels of the present invention were vastly superior to steel. Thus, testing at various frequencies revealed no measurable transmission loss at frequencies up to five kilocycles. At twenty kilocycles, the panels averaged one db transmission loss. At fifty kilocycles the panels averaged but three db transmission loss.

It was found that panels such as panel No. 2 can deform to a greater degree without failure due to its more flexible center than a panel such as panel No. 3. This is probably attributable to the fact that panel No. 2 allows more shear strain to occur without rupture.

The present invention may be embodied in other specific forms without departing from the spirit or essential attributes thereof and, accordingly, reference should be made to the appended claims, rather than to the foregoing specification as indicating the scope of the invention.

I claim:

1. A sonar dome including an acoustic window through which sound waves may be transmitted, said dome consisting of three layers of laminated reinforced plastic material, with each of the outer layers of said reinforced plastic material being acoustically identical in section, the center layer of said reinforced plastic material consisting of a relatively visco-elastic damping material compared to the outer layers, and the stiffness of said middle layer being sufficient so that the entire structure of the dome partakes of the same flexural vibration, and with the combined thickness of the three layers being appreciably less than the shortest wavelengths of the sound waves transmitted through the dome.

2. A sonar dome in accordance with claim 1 in which the reinforced plastic in each of the layers comprises a polyester.

3. A sonar dome in accordance with claim 1 in which the reinforcement in each of the reinforced plastic layers comprises glass fibers.

4. A self-damping material through which sound waves may be transmitted comprising a laminated structure formed from three layers of laminated reinforced plastic material, each of the outer layers being substantially acoustically identical in section, the center layer being formed from a more visco-elastic damping material than the outer layers, the stiffness of said middle layer being sufficient so that the entire structure partakes of the same flexural vibration, and with the combined thickness of the three layers being appreciably less than the shortest wave length of the sound waves capable of being transmitted therethrough.

5. A sonar dome through which sound waves may be transmitted comprising an acoustic window, means for securing said window to a vessel, said window having an impedance substantially identical with water, said window being formed from three layers laminated together, each layer being a laminated reinforced plastic material, each of the outer layers being substantially acoustically identical in section, the center layer being formed from a more visco-elastic damping material than the outer layers, the stiffness of said center layer being sufficient so that the entire window partakes of the same flexural vibration, and with the combined thickness of the three layers being appreciably less than the shortest wavelength of the sound waves capable of being transmitted through the window.

References Cited in the file of this patent

UNITED STATES PATENTS

| | | |
|---|---|---|
| 2,434,666 | Mason | Jan. 20, 1948 |
| 2,444,911 | Benioff | July 13, 1948 |
| 2,453,665 | Kropa | Nov. 9, 1948 |
| 2,575,339 | Fitzgerald | Nov. 20, 1951 |
| 2,579,949 | Minnear | Dec. 25, 1951 |
| 2,613,397 | Borkland | Oct. 14, 1952 |
| 2,806,509 | Bozzaco et al. | Sept. 17, 1957 |